US011127132B2

(12) United States Patent
Poliwoda et al.

(10) Patent No.: US 11,127,132 B2
(45) Date of Patent: Sep. 21, 2021

(54) METHOD AND DEVICE FOR MULTIPLE EDGE DETECTION

(71) Applicant: Volume Graphics GmbH, Heidelberg (DE)

(72) Inventors: Christoph Poliwoda, Mannheim (DE); Thomas Gunther, Heidelberg (DE); Christof Reinhart, Heidelberg (DE)

(73) Assignee: Volume Graphics GmbH, Heidelberg (DE)

( * ) Notice: Subject to any disclaimer, the term of this patent is extended or adjusted under 35 U.S.C. 154(b) by 56 days.

(21) Appl. No.: 16/488,929

(22) PCT Filed: Jan. 16, 2018

(86) PCT No.: PCT/EP2018/050973
§ 371 (c)(1),
(2) Date: Aug. 26, 2019

(87) PCT Pub. No.: WO2018/153575
PCT Pub. Date: Aug. 30, 2018

(65) Prior Publication Data
US 2020/0065958 A1      Feb. 27, 2020

(30) Foreign Application Priority Data

Feb. 24, 2017   (DE) .................. 10 2017 103 951.1

(51) Int. Cl.
*G06T 7/00*       (2017.01)
*G06T 7/13*       (2017.01)

(52) U.S. Cl.
CPC .............. *G06T 7/0004* (2013.01); *G06T 7/13* (2017.01); *G06T 2207/10072* (2013.01); *G06T 2207/20164* (2013.01); *G06T 2207/30164* (2013.01)

(58) Field of Classification Search
CPC .................. G06T 7/0004; G06T 7/13
(Continued)

(56) References Cited

U.S. PATENT DOCUMENTS

| 2006/0056732 | A1* | 3/2006 | Holmes ..................... G06T 7/33 382/286 |
| 2006/0262989 | A1* | 11/2006 | Tegenbosch ............ G06T 5/003 382/261 |

FOREIGN PATENT DOCUMENTS

| DE | 10 2014 100 419 A1 | 7/2015 |
| DE | 10 2014 115 851 A | 5/2016 |

(Continued)

OTHER PUBLICATIONS

Ramakant Nevatia: "Chapter 7: Edge and Curve Detection" In: "Machine Perception", Jan. 1, 1982, Prentice Hall, XP055435541, ISBN: 978-0-13-541904-5, pp. 100-127, section 7.1.2.

(Continued)

*Primary Examiner* — Ayodeji O Ayotunde
(74) *Attorney, Agent, or Firm* — SoCal IP Law Group LLP; Angelo Gaz

(57) ABSTRACT

Described is a computer-implemented method for determining material interfaces of an object by means of at least one measurement of the object, a rasterized representation of the object having a plurality of pixels being produced by means of the measurement, each pixel having at least one piece of image information, which indicates a value of a measurement variable for the object at the position of the measurement point. The method comprises the determining of a parameterization of the rasterized representation of the object, the parameterization assigning at least one parameter to each of the measurement points of a subset of the measurement points of the representation, and the applying of at least one parameter-dependent edge-detection operator to the measurement points of the rasterized representation, (Continued)

Figure 1:
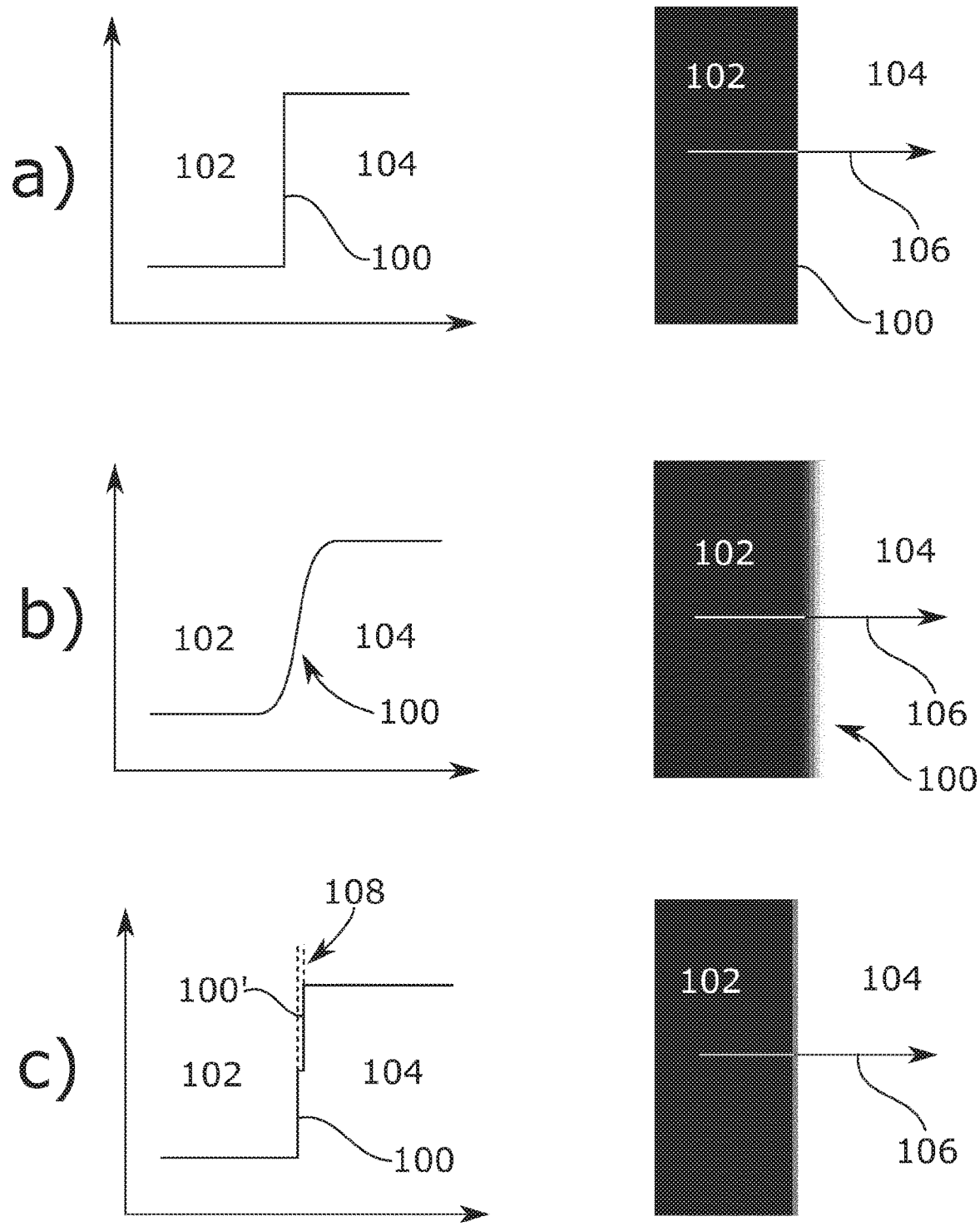

an edge-detection operator being designed to determine the location of at least one material interface in the rasterized representation.

11 Claims, 3 Drawing Sheets

(58) Field of Classification Search
USPC .......................................................... 382/152
See application file for complete search history.

(56) References Cited

FOREIGN PATENT DOCUMENTS

| JP | 2014-55864 A | 3/2014 |
|----|--------------|--------|
| JP | 2008-541110 A | 11/2018 |

OTHER PUBLICATIONS

European Patent Office/International Searching Authority, Written Opinion for PCT Application No. PCT/EP2018/050973, dated Apr. 11, 2018, 7 pages.
European Patent Office/International Searching Authority, International Search Report for PCT Application No. PCT/EP2018/050973, dated Apr. 11, 2018, 10 pages.
German Patent Office, Office Action for German Patent Application No. 10 2017 103 951.1 dated Mar. 16, 2018, 8 pages.
Ziou, D et al. "Edge Detection Techniques—an Overview", Pattern Recognition. Image Analy, Allen Press, Lawrence, KS, US., vol. 8, No. 4, Jan. 1, 1998, pp. 537-559, XP008029269, ISSN: 1054-6618.
Japan Patent Office, Notifications of Reasons for Rejection to Japanese Patent Application No. 2019-546277, dated Jan. 26, 2021.
Nakamura, Takahiro et al. "The Fan Operator for Detection of Junctions, Corners and Edges," Information Processing Society of Japan Research Report Computer Vision and Image Media (CVIM) Jan. 24, 1992. pp. 119-126.

* cited by examiner

METHOD AND DEVICE FOR MULTIPLE EDGE DETECTION

The invention relates to a computer-implemented method for determining material interfaces of an object.

Determining the location of material interfaces in an object by imaging methods is a pervasive problem in the prior art. A material interface describes, in an object such as a workpiece, exactly the interface along which different materials are adjacent to each other in the object. As well as interfaces within an object, along which there is, for example, a transition from a plastic to a metal, a material interface can also mean the face which delimits an object from its surroundings or from the ambient air. Therefore, determining interfaces can in particular also be used to determine the dimensions of objects under examination. A technical field in which the exact determination of interfaces is increasingly gaining significance is for example the computed-tomographic examination of workpieces, which is used for quality assurance in manufacturing, among other things.

Independently of the imaging methods used, there is often the problem in the prior art that material interfaces lying closely together cannot be distinguished precisely or, in the worst case, cannot be distinguished at all. Such interfaces lying closely together are present, for example, in a coating of a body in which the coating is only a few micrometers thick, for example. Furthermore, thin structures or connecting pieces such as copper conductors on a printed circuit board often also cannot be imaged or can be imaged only imprecisely using the methods known from the prior art. A further example of material interfaces which are difficult to detect are cracks and pores in workpieces. A crack or pore is effectively likewise a sequence of closely adjacent material interfaces at which a transition takes place from the material of the workpiece under examination to air and vice versa. Since such cracks or pores can have a hugely negative effect on the functionality of a workpiece under examination, there is an urgent need in the prior art for suitable methods with which such "multiple edges", that is, closely successive material interfaces, can also be detected during examination of a workpiece. Similarly, there is a high demand for technology for detecting coatings and the thickness thereof, since a continuous, undamaged and sufficiently thick coating is often absolutely necessary for the desired functionality of a workpiece.

The main features of the invention are specified herein.

In a first aspect, the invention relates to a computer-implemented method for determining material interfaces of an object by means of at least one measurement of the object, wherein a rasterized representation of the object is generated by means of the measurement. The rasterized representation has a multiplicity of measurement points, wherein a measurement point has at least one piece of image information. The image information indicates a value of a measurement variable for the object at the position of the measurement point. The method according to the invention then comprises firstly determining a parameterization of the rasterized representation of the object, wherein the parameterization assigns at least one parameter to each of the measurement points of a subset of the measurement points of the representation. At least one parameter-dependent edge-detection operator is then applied to the measurement points of the rasterized representation. An edge-detection operator is designed to determine the location of at least one material interface in the rasterized representation.

In the determination of the location of a material interface from the image information of a measurement point, the edge-detection operator takes into account at least the image information of a subset of the measurement points adjacent to the measurement point in the rasterized representation. Furthermore, at least one of the edge-detection operators is a multiple edge-detection operator which is designed, when applied to a measurement point, to determine the location of at least two directly adjacent material interfaces in the object. The multiple edge-detection operator is applied to a measurement point if and only if at least one of the parameters of the measurement point indicates that a plurality of material interfaces are arranged directly adjacent to each other within the surroundings of the measurement point.

Any desired imaging method can be used to carry out the measurement. In particular, computed tomography, magnetic resonance tomography, positron emission tomography and 3D sonography can be mentioned here.

The method according to the invention has the advantage that the targeted application of an edge-detection operator which can also resolve directly adjacent material interfaces allows even very thin structures such as cracks and coatings to be detected in an object under examination. Experiments have shown that algorithms for the targeted searching for a sequence of directly adjacent material interfaces entail increased computing complexity compared with algorithms for determining an individual, isolated material interface. However, this increased computing complexity is reduced to a manageable amount according to the invention by, on the basis of a parameterization of the measurement points, only applying a multiple edge-detection operator when the application is indicated by a corresponding parameter of the measurement points. The computing complexity for detecting multiple edges is thus reduced to a minimum. If, however, the parameterization of a measurement point does not indicate that a multiple edge-detection operator should be applied, the method provides for an edge-detection operator which is designed only to detect an individual material interface to be applied to the measurement point.

The rasterized representation of the object under examination which is generated as a result of the measurement can be both two-dimensional and three-dimensional. In the case of a three-dimensional representation, the measurement points are volume pixels or voxels, whereas the image points in the two-dimensional representation are simple pixels. The image information of a voxel indicates the average value of a measurement variable for the object, which results from a convolution of the surroundings of the voxel under consideration using the point spread function (PSF) of the system used. It is also possible to break down a three-dimensional representation of an object into a series of two-dimensional sectional images of the three-dimensional representation.

A "value of a measurement variable" is generally a numerical value which quantifies a certain property of a material of the object under examination such that the corresponding material can be distinguished from other materials in the rasterized representation. The value of the measurement variable should not be confused with the parameter(s) of a measurement point which are assigned to the measurement points as a result of the parameterization of the rasterized representation. Whereas the value of the measurement variable describes the material or a material property of the object under examination, the parameters of the parameterization act as additional information which can be used when determining material interfaces. For example, if the imaging method used for the measurement is computed tomography, the value of the measurement variable can describe, for example, the degree of attenuation x-ray radiation undergoes when passing through the corresponding material. The measurement variable under consideration would therefore be the radiodensity of the irradiated material. However, if the imaging method is magnetic resonance tomography, the value of the measurement variable can be the resonant frequency or the relaxation time of the material.

The raster used for the rasterized representation can in principle have any desired form. In the simplest case, the raster has orthogonal axes which are divided into segments at regular intervals in all three dimensions. The volume described in all three dimensions by one segment then defines exactly one voxel. However, the raster used is not limited to such a uniform and orthogonal raster. Rather, the axes of the raster can also follow other arrangements, resulting in a different, for example non-cubic, shape for the voxels. For instance, a raster can also be hexagonal. All the voxels or pixels in the rasterized representation do not have to be of equal size either. Rather, it is also possible, for example, to combine a multiplicity of measurement points with identical image information into a single common voxel or pixel.

According to the invention, a "parameter" as described above can also mean any desired complex variable as well as a mere number or value. For instance, an individual parameter of a measurement point can indicate whether or not there is a direct sequence of adjacent material interfaces in the surroundings of the measurement point. In this case, the parameter could be defined as a binary variable. The parameter could also give information about how many material interfaces there are in the proximity of the measurement point. Finally, a parameter could also contain information relating to the materials which meet each other at the material interface(s). For example, even an expected item of image information of a measurement point could thus be coded by the parameter. Any other complex information which is relevant for the determination of a material interface can also be subsumed under the term "parameter" below.

As already explained above, methods known in the prior art for detecting material interfaces are often not able to distinguish a dense sequence of material interfaces in direct succession from an individual material interface or to determine exactly the respective locations of the individual material interfaces in a dense sequence of material interfaces arranged adjacently to each other.

This is usually attributable to blurring effects in the generated images of the object under examination. The designation "directly adjacent material interfaces" therefore means all the sequences of material interfaces which can no longer be resolved as individual material interfaces by an edge-detection operator which is only designed to detect a single material interface. The designation "directly adjacent" can mean different lengths depending on the imaging method used and the measurement situation. If an object is captured greatly magnified with a very small focus of the measurement apparatus, the expression "directly adjacent" can refer to a distance between two interfaces of a few micrometers, whereas at a lower magnification a sequence of "directly adjacent material interfaces" can also be present with a distance of a few millimeters between the material interfaces.

In the field of digital image processing, operators for analyzing and processing image data are known in many different variants. A prominent example of an operator which is often used in digital image processing to detect edges is the Sobel operator. The Sobel operator is substantially a tensor of rank n with defined inputs. The rank of the tensor is determined by the number of dimensions of the image under examination. The application of such an operator to an image or an image point takes place by a discrete convolution of the image data of an image with the tensor of the operator.

In the context of the present application, however, the designation "operator" does not necessarily mean only a mere tensor. Rather, an individual operator in the context of the present invention can be any desired complex combination of convolution tensors, arithmetic operations, curve fits or similar which are performed consecutively in a certain sequence and each further process the results of preceding operations of the operator. An operator within the context of the present application does not necessarily have to contain a convolution tensor within the meaning of the above-described Sobel operator. Rather, it is also possible for an operator to manage completely without the performance of a convolution of the imaging data with a convolution tensor. The only relevant thing in the definition of an operator is that the application of the operator to the imaging data achieves the desired result, specifically the detection of material interfaces.

The meaning of the expression "application of a parameter-dependent operator" can be different depending on the application case and type of the operator. For instance, as explained above, a parameter can indicate whether a sequence of directly adjacent material boundary layers must be detected. In this case, the parameter dependency consists in that different operators are applied depending on the value of the parameter. However, the parameter dependency can also be expressed in that one or more of the operations carried out when an operator is applied are dependent on a parameter. A parameter can have an influence on the performance of an operator in many different variants. For example, an offset which should be taken into account when carrying out an arithmetic operation can be coded by a parameter. Furthermore, a particular set of measurement points which should be taken into account in the application of the operator can also be specified by a parameter. It is also possible for the parameter to code additional information which has an influence on the application of the operator. For instance, the parameter can contain the impulse response of the imaging system, also known as point spread function (PSF), so that this can be taken into account in the application of the operator.

According to the invention, the location of a material interface is not defined by the raster or the arrangement of the raster points. Rather, the location of a material interface determined in the course of the method can also be situated between the raster points. Therefore, the method according to the invention also allows a determination of material interfaces of sub-pixel or sub-voxel precision, in which interfaces can be determined with a precision of $1/100$ voxel and below, depending on the quality of the measurement data used.

According to one embodiment, the image information of a measurement point comprises at least one gray value which indicates the value of the measurement variable for the object at the location of the measurement point. In this case, the multiple edge-detection operator is designed to determine the location of the individual material interfaces of a multiple edge proceeding from a measurement point by fitting a theoretical model of the gray values for a multiple edge to the gray values of measurement points and/or to values derived from the gray values in the surroundings of the measurement point. A "multiple edge" in this case means a sequence of directly adjacent material interfaces. The designation "at the location of the measurement point" describes exactly the point or spatial region of the object under examination which corresponds to the pixel or voxel under consideration in the rasterized representation. To detect a multiple edge, the measurement point under consideration must be positioned in the proximity of an edge, which may possibly be a multiple edge. A "proximity of an edge" means the set of all the image points, the gray value of which is influenced by the gray values of measurement points which image the edge to be detected owing to the impulse response of the system used.

The theoretical profile of the gray values for a multiple edge can be determined taking into account a multiplicity of influencing variables. For example, it is possible in this manner to take into account the effect of the PSF of the imaging system used to capture the measurement points in the creation of the theoretical model. The PSF of an imaging system generally leads to "blurring" of the measurement values so that actually sharp edges of an object under examination, as they actually are at material interfaces, appear as a faded, gradual transition in the image. If known, further factors which result in non-ideal imaging of the object during measurement of the object can also be taken into account in the determination of the theoretical profile. Furthermore, the theoretical profile of the gray values can be determined depending on the expected number of material boundary layers. According to one embodiment, for instance, a parameter of a measurement point indicates not only whether there is a multiple edge in the immediate surroundings of the measurement point but also how many individual material boundary layers the multiple edge contains. Accordingly, when the multiple edge-detection operator is applied, exactly the expected theoretical profile of the gray values which was determined assuming the correct number of individual material boundary layers can be used for determining the locations of the material boundary layers.

By adjusting the theoretical profile of the gray values of a multiple edge to the present gray values, the position of the individual material boundary layers can be determined efficiently. Any desired curve fitting method can be used to adjust the theoretical profile to the measurement values. For example, the least squares method can be used here. By selecting the iterations performed for curve adjustment, the accuracy of the edge determination can be considered in relation to the computing load caused.

According to a further embodiment, the parameterization for a subset of the measurement points assigns at least two parameters to each measurement point of the subset. For the measurement points of the subset, a parameter-dependent edge-detection operator is applied to the measurement point for each assigned parameter. For example, it is possible for it to be known when creating the parameterization where potential multiple edges could occur but not how many individual material boundary layers are included in the multiple edges. In this case, the parameterization can define different numbers of individual material interfaces in the multiple edges to be detected, so that the corresponding multiple edge-detection operators are applied to the measurement point. For instance, a defined spectrum of potential multiple edges can be defined by a suitable parameterization.

In addition to representing an item of information as to whether there is a multiple edge in the surroundings of a measurement point, the parameters of the parameterization can also contain further information which can be useful in detecting material boundary layers. For instance, according to a further embodiment, at least one of the parameters of a measurement point defines an analysis direction within the rasterized representation. The edge-detection operators are then designed, when applied to a measurement point, to determine the location of at least one material interface in the analysis direction defined by the parameter of the measurement point. An "analysis direction" can mean a direction within the raster of the selected representation of the object. The analysis direction can for example be specified by a vector which is defined in the coordinate system spanned by the raster.

The analysis direction defined by a parameter can for example be derived from the knowledge of the basic geometric shape of the object under examination. Experiments have shown that a fixed definition of the analysis direction allows the precision of the edge detection to be improved over methods known in the prior art, which for example determine the analysis direction from a gradient of the gray values. Furthermore, during the definition of the analysis direction, particular geometries or characteristics of the object under examination can be taken into account, which could not be taken into account if the analysis direction were determined in a different manner, for example by determining a gradient of the gray values.

According to a further embodiment, the above-described definition of analysis directions can be combined with the concept of assigning at least two parameters to at least one subset of the measurement points. For instance, according to one embodiment, an analysis direction is defined for each subset of the measurement points by at least two of the parameters of a measurement point, wherein, for each analysis direction, at least one edge-detection operator is applied to the measurement point which determines the location of at least one material interface in the analysis direction in question. Specifying a plurality of analysis directions in which material interfaces are sought proceeding from a measurement point has the advantage that complex geometries, such as right-angled corners, which can be detected only imprecisely using the methods known in the prior art can also be detected reliably and exactly. For instance, if the analysis direction is determined from a gradient of the gray values, as is known in the prior art, reliable and exact detection of corners and angles is not possible. Rather, if an analysis direction determined from a gradient is used, a "blurring" or "rounding" of the interfaces can be seen in the region of the corners, as a result of which the material interfaces thereof appear rather rounded instead of sharp in the region of corners. However, if the analysis of such a corner is divided into one analysis per edge direction, the aforementioned effects of the unclean edge detection in the region of angles and corners can be avoided.

According to one embodiment, the parameterization which is used according to the invention in the determination of material interfaces is determined from a model of the object under examination. For instance, it can be directly derived from a model at which points coatings are provided, where cracks can occur according to experience in the material during production of an object, or where in the object there are particular geometries such as corners and angles which have to be taken into account separately during determination of the material interfaces. The parameter model thus determined can then be transferred to the data from a measurement of the object, so that the subsequent determination of the material interfaces can take place by means of suitable edge-detection operators which in turn depend on the parameters of the parameterization. Such a model can be derived by a further measurement process, for example by an optical measurement. For example, the surface of the object to be examined can first be scanned by means of a laser so that a surface model can be created.

Alternatively, according to one embodiment, the model of the object under examination is a CAD model. The use of a CAD model has the advantage that the model of the object under examination is already available completely in digital form with the planned dimensioning and therefore it can easily be transferred to measurement data from a measurement of the object.

According to another embodiment, in addition to the use of a CAD model, the parameterization is generated by at least one user input. For example, a user monitoring the examination of the object inspects the rasterized representation, created during the measurement, of the object under examination and marks regions in which a multiple edge is likely by eye or on the basis of empirical values by means of a suitable input device. Furthermore, the user can also define the analysis directions in the displayed rasterized representation during the subsequent edge detection by means of a suitable interface.

Furthermore, a parameterization at least relating to the application of a multiple edge-detection operator can also be derived directly from the rasterized representation which was obtained from the measurement of the object. To this end, according to a further embodiment, determining the parameterization comprises first applying a single edge-detection operator to the measurement points of the rasterized representation, wherein the single edge-detection operator is designed to determine the location of an individual material interface in the rasterized representation. Then a measure of uncertainty is determined for the location of the previously determined material interfaces. If the measure of uncertainty thus determined for a material interface exceeds a defined threshold value, the determination of the parameterization further comprises assigning a parameter to the measurement points in the surroundings of the material interface, wherein the parameter indicates in each case that a plurality of material interfaces are arranged directly adjacent to each other within the surroundings of the measurement point and consequently a multiple edge-detection operator should be used.

A measure of uncertainty for the location of a determined material interface can for example be determined by determining the gradient of the gray values over the determined material interface. If the material interface is actually an isolated, individual material interface, it would be expected that the gradient over the material interface is determined substantially by the impulse response of the system used and the operator used to determine the gradient. Assuming a Gaussian impulse response and Gaussian smoothing to determine the gradient, it would be expected that the gradient over a material interface has a Gaussian profile. However, if the gradient determined deviates significantly from the expected Gaussian shape, the material interface determined is probably not an isolated edge but at least a sequence of two or more directly adjacent edges. The threshold value used here can be determined for example by repeated measurements or determinations of the parameterization and a comparison of the parameterization with the actual characteristics of the object under examination. In this manner, even if information relating to the geometry of the object under examination is initially absent, a suitable parameterization of the object under examination can be determined and then used for reliable edge detection.

To determine a measure of uncertainty, it can also be checked directly how well the gray values in the region of a material interface under examination match a single edge. When the edge position is determined by fitting a model of a single edge to the gray values in the region of the material interface, the results can be used, for example, to check by means of an $\chi^2$ test how well the fit of the model of the single edge matches the available gray values. From a certain threshold value for $\chi^2$, it can be understood that the basic assumption that the material interface is a single edge cannot be correct. Consequently, the corresponding image points can be assigned a parameter which indicates that a multiple edge is probably present.

The described determination of the parameterization can be implemented as an iterative process. First, the material interfaces are determined over the entire rasterized representation by means of an operator for detecting isolated material interfaces. Then a check is carried out as described above as to whether the material interfaces thus determined are possibly not isolated interfaces but rather must be treated as a multiple edge. In the cases in which it is determined that the determined material interface is possibly a multiple edge, a parameter is set for the corresponding measurement points which indicates the application of an edge-detection operator for detecting double edges, that is, two directly successive material interfaces.

Then material interfaces are determined again for all the regions in which such a parameter has been set, and in the second pass an edge-detection operator for double edges is applied to the measurement points for the regions indicated by the corresponding parameters. Then another check is carried out for the determined double edges as to whether they are possibly not a sequence of two material interfaces but rather a larger number of material interfaces. For all the regions in which this is the case, a corresponding parameter is again set at the relevant measurement points, so that in a subsequent edge-detection process an edge-detection operator is applied which is designed to detect a sequence of three directly adjacent material interfaces.

By iteratively increasing the number of sought material interfaces, the rasterized representation can thus be carried out successively according to multiple edges of any order, that is, with any number of successive material interfaces.

In a further aspect, the invention relates to a device for carrying out measurements of an object and for determining material interfaces of an object by means of at least one measurement of the object, wherein a rasterized representation of the object is generated by the measurement, and wherein the rasterized representation has a multiplicity of measurement points. A measurement point has at least one item of image information which indicates a material-specific parameter of the object at the position of the measurement point. The device is designed to determine a parameterization of the rasterized representation of the object obtained from the measurement, wherein the parameterization assigns at least one parameter to each measurement point of the representation. The device is also designed to apply at least one parameter-dependent edge-detection operator to the measurement points of the rasterized representation, wherein an edge-detection operator is designed to determine the location of at least one material interface in the rasterized representation from the image information of a measurement point. In the determination of the location of a material interface from the image information of a measurement point, the edge-detection operator takes into account at least the image information of a subset of the measurement points adjacent to the measurement point in the rasterized representation. At least one of the edge-detection operators is a multiple edge-detection operator which is designed, when applied to a measurement point, to determine the location of at least two directly adjacent material interfaces in the object. The multiple edge-detection operator is applied to a measurement point if and only if at least one of the parameters of the measurement point indicates that a plurality of material interfaces are arranged directly adjacent to each other within the surroundings of the measurement point.

In another aspect, the invention relates to a computer program product having instructions which can be executed by a computer and, when executed on a computer, prompt the computer to carry out the method as described above.

Figure 2:
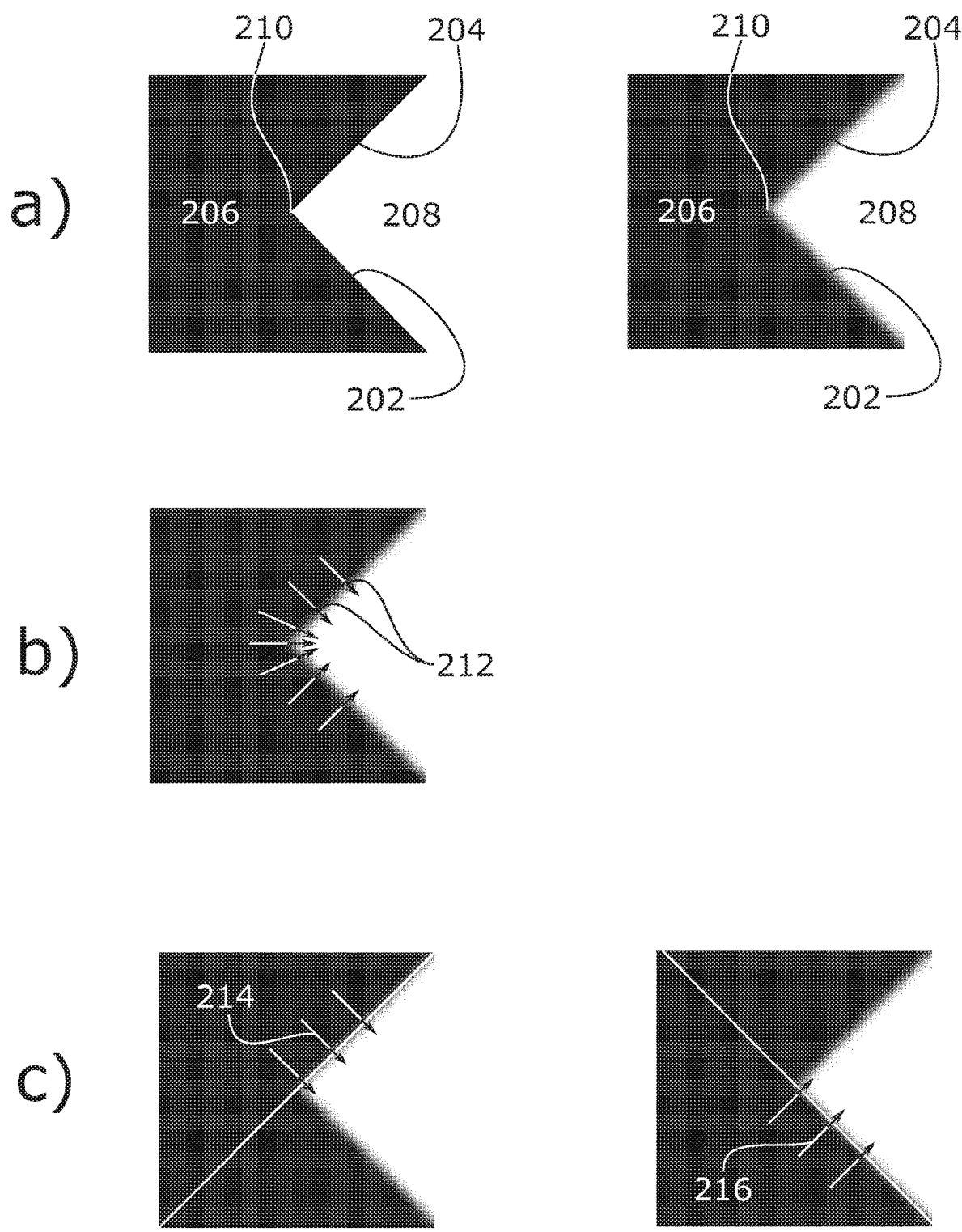
Figure 3:
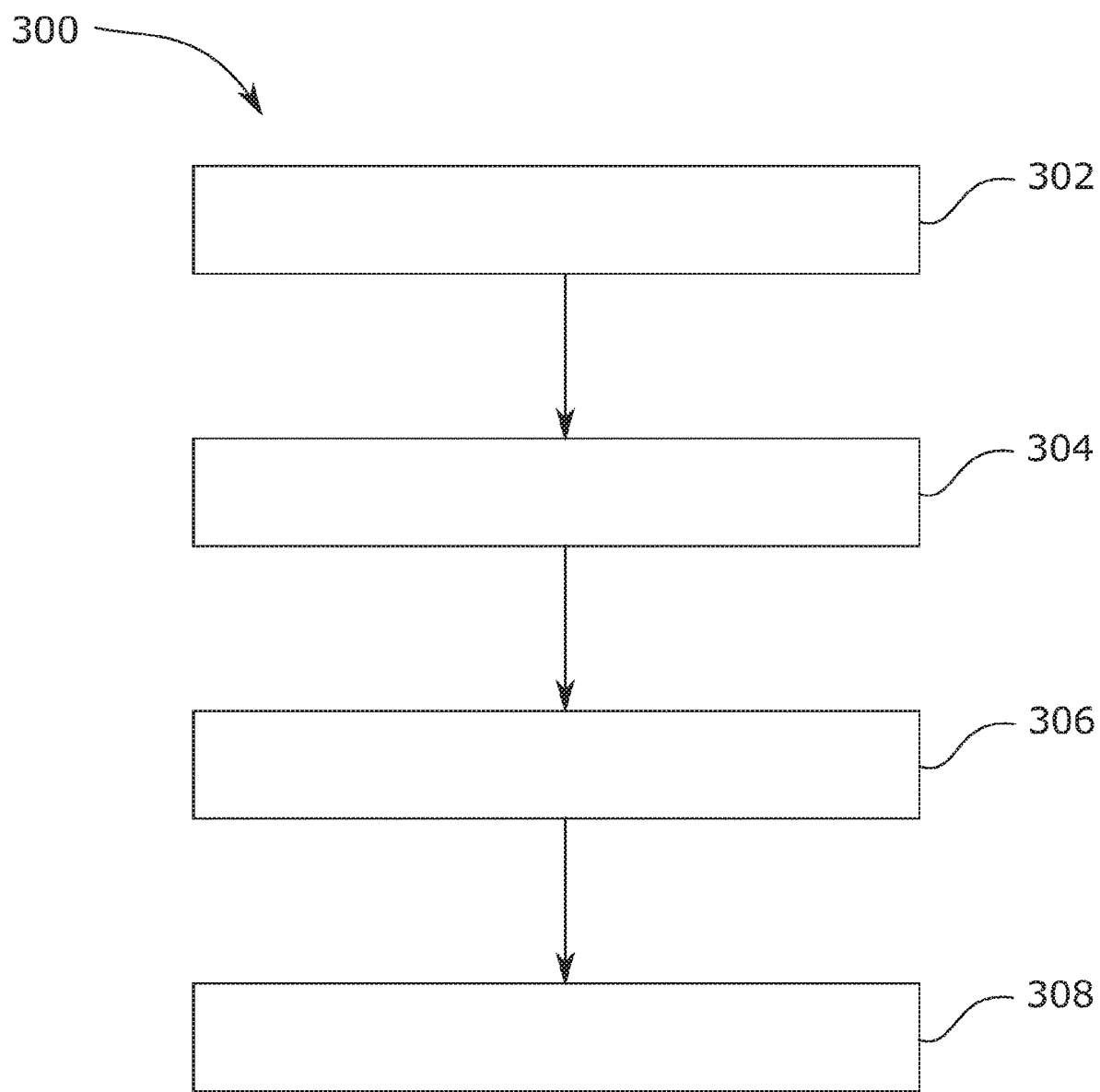

Further features, details and advantages of the invention are clear from the wording of the claims and from the following description of exemplary embodiments using the drawings. In the figures, FIG. 1 shows schematic diagrams of a single material interface and a multiple edge, FIG. 2 shows schematic diagrams of a corner with different analysis directions, and FIG. 3 shows a flow chart for carrying out the method according to the invention.

Similar or identical features are denoted with the same reference sign below.

FIG. 1 *a*) schematically shows an idealized but not technically realizable image of a material interface 100, which represents the transition between a first region 102 with a first material and a second region 104 with a second material in an object. A two-dimensional representation of the transition is shown on the right. Such a representation can theoretically be obtained for example by examining an object by means of a computed tomography scanner. In this case, an object is irradiated with x-rays, wherein the x-rays, after passing through the object under examination, expose a detector situated behind the object. Owing to different radiodensities of the materials present in an object, the x-rays passing through the object are attenuated to different degrees, and therefore the respective density and x-ray absorption of the irradiated media of the object under consideration can be deduced from the x-ray intensity absorbed by the detector. In computed tomography, x-ray exposures are carried out from different directions, and a three-dimensional image of the object is then reconstructed from the sum of the x-ray exposures. The representation shown in FIG. 1 *a*) is a two-dimensional sectional view which can be derived from the three-dimensional image. However, the invention is not limited to such two-dimensional imaging but can also be used in three-dimensional imaging.

The material interface 100 shown in FIG. 1 *a*) can be for example the transition from air to a metal. Owing to the lower x-ray absorption of air, the region 102 appears darker than the region 104.

The left side of FIG. 1 *a*) also shows a diagram of the radiodensity along the arrow 106. The arrow 106 is oriented perpendicular to the material interface 100. The position along the arrow 106 is plotted on the horizontal axis, while the corresponding radiodensity at each position is plotted on the vertical axis. The transition between the regions 102 and 104 is shown here as a sharp interface, which can be described mathematically by a step function.

As already explained above, FIG. 1 *a*) shows only an idealized image of a material interface 100. Such an image cannot be technically realized owing to various circumstances. For instance, it is known from the theory of electrical signal processing that a signal always can only be processed with a limited bandwidth. Consequently, a sharp edge, which corresponds mathematically to a superimposition of an infinite number of periodic signals, cannot be realized in signal and image processing. Rather, the point spread function (PSF) of the imaging system is always included in the imaging of an object. Mathematically, the effect of the band-limited imaging system corresponds to a convolution of the signal to be imaged with the PSF of the system. The PSF of an imaging system often has the approximate shape of a Gaussian bell.

FIG. 1*b*) shows a real representation of the same material transition 100. Again, a two-dimensional view of the material transition 100 from above is shown on the right, while the curve of the radiodensity along the arrow 106 is shown on the left. The convolution of the sharp edge as shown in FIG. 1 *a*) with a Gaussian PSF of the imaging system thus results in a blurred edge in which the exact position of the material interface 100 can no longer be clearly seen. In the prior art, however, there are different approaches to determining an edge position from such an edge profile despite the blurry interface. A prominent example of this is the Canny algorithm, which determines the edge position from the gradient and the second derivative of the gray value profile. A further approach to determining the edge position consists in determining the difference between the maximum and minimum gray value in the regions 102 and 104 and then assuming that the edge must lie at the point at which the gray value corresponds to half of this difference.

However, these approaches are problematic as soon as there is a sequence of closely adjacent material interfaces instead of an isolated interface. Such a case is shown by way of example in an idealized, non-blurred representation in FIG. 1 *c*). Again, there is for example air in the first region 102, and there is for example metal in the second region 104. The image shown in FIG. 1 *c*) can result for example if the metal in the region 104 is provided on its surface with a coating, the specific x-ray absorption of which differs from the absorption by metal. The coating is then visible as an additional region 108 with a different gray scale from air and metal. The region 108 is very thin. A coating can for example be a layer with a thickness of a few micrometers.

The above-described "blurring" of the edge profile owing to the PSF of the system now means that the blurred profile of the single material interface can hardly be distinguished from a sequence of closely adjacent material interfaces. In fact, the result of a convolution of the edge profile shown in FIG. 1 *c*) appears very similar to the edge profile shown in FIG. 1 *b*). Consequently, it is initially impossible to distinguish a single edge from a sequence of closely adjacent edges, that is, a "multiple edge", using the methods known from the prior art.

According to the invention, however, the position of the individual material interfaces can be determined from the blurred profile of a multiple edge if it is already known when examining the gray value profile that it is not an isolated interface but a multiple edge. From the knowledge that a multiple edge is present, it can be derived how such a multiple edge might look after convolution with the PSF of the system. If the model thus obtained is then compared with the found profile of the gray values and/or with a profile of values derived from the gray values, the positions of the individual material interfaces of the multiple edge can be determined. According to the invention, it is indicated by parameters assigned to the image points whether, when examining a gray value profile in the region of a material interface, an isolated interface should be assumed, or whether there is a multiple edge and therefore a corresponding model should be used as a basis.

The method according to the invention is not limited to a direct sequence of two material interfaces. Rather, it is also possible for any number of closely adjacent interfaces to be specified, so that, for example, a sequence of five adjacent material interfaces is assumed in the analysis of the gray values. Such a sequence can for example arise with a painted surface on which a primer, a color paint and a clear varnish are applied one on top of the other, each having a thickness of only a few micrometers.

FIG. 2 *a*) shows a schematic diagram of a corner, that is, a geometry in which two material interfaces 202 and 204 meet at a right angle. If such a geometry is imaged by an imaging method such as computed tomography, the image shown on the right in FIG. 2 *a*) is obtained, for example. Again, the material interfaces 202 and 204 shown in FIG. 2 *a*) can each be for example the transition from air to a metal.

The above-described mechanisms which result in "blurring" of inherently sharp edges, cause, in the region of the corner 210, that is, the point at which the material interfaces 202 and 204 meet each other, rounding of the inherently sharp corner 210, as is shown on the right in FIG. 2 *a*). Algorithms, such as the aforementioned Canny algorithm, which use the gradients of a gray value profile to determine the position of a blurred material interface, necessarily produce an error in determining the location of the material interfaces in the region of the peak 210 if the corner is blurred. By way of example, the local gradients along the material interfaces are shown in FIG. 2 *b*) by arrows 212. In the regions in which the material interfaces 202 and 204 have a straight profile and the gray values of the material interfaces 202 and 204 are not influenced by the transition in the region of the peak 210, the gradient is actually perpendicular to the material interfaces 202 and 204. Therefore, good results in the determination of the position of the material interfaces can be expected here if the Canny operator is applied.

However, this approach no longer works in the region of the peak 210. As can easily be seen in FIG. 2 *b*), the gradient in the region of the peak 210 namely changes only gradually from the orientation in the region of the first material interface 202 to the orientation in the region of the second material interface 204. If the corner were reproduced perfectly, however, the gradient would have to "flip" instantaneously from its first orientation to the second orientation at the peak 210. However, this is not the case owing to the blurred corner. Consequently, the Canny operator would detect merely a rounded corner instead of a sharp corner. The exact position of the peak 210 and the exact profile of the material interfaces 202 and 204 up to the peak thus cannot be determined by the Canny operator.

The solution according to the invention to this circumstance is shown by way of example in FIG. 2 *c*). According to the invention, to determine the material interfaces 202 and 204, the direction in which a material interface should be sought is defined at the start. A first analysis direction 214 (left) is defined for a first material interface 202, and a second analysis direction 216 (right) is defined for a second material interface 204. The analysis directions are maintained over the full width of the material interfaces 202 and 204. This means, inter alia, that a material interface is sought in a plurality of directions from individual measurement points in the region of the peak 210. According to the invention, these measurement points are therefore assigned a plurality of parameters which each specify an analysis direction. However, this is not explicitly shown in FIG. 2 *c*) for the sake of clarity. The fixed specification of the analysis direction allows the location of the material interfaces 202 and 204 to be determined exactly, in particular in the region of the peak 210.

Although only the two-dimensional case is shown in FIG. 2, the invention can also be used analogously in three-dimensional imaging of an object. In this scenario, individual measurement points can also be assigned more than two parameters to define an analysis direction.

FIG. 3 shows a flow chart of an embodiment of the method according to the invention. The method can for example be implemented using a device which comprises at least one computed tomography scanner and a data processing unit connected to the computed tomography scanner. The data processing unit does not necessarily have to be present as a contiguous physical entity but can also be decentralized, for example within the meaning of cloud computing.

In a first method step 302 of the method 300 shown in FIG. 3, a measurement of an object to be examined is carried out. The object can be, for example, a component which has been removed from a production line and should be checked for quality assurance. The measurement is preferably a computed tomography measurement, as explained above. However, the method can in principle also be applied to the measurement results of other imaging methods, for example magnetic resonance tomography or 3D ultrasound.

The measurement initially generates raw data, which corresponds in the case of computed tomography, for example, to a multiplicity of x-ray images of the object under examination from a multiplicity of directions. In step 204, a three-dimensional image of the object under examination is generated from the raw data thus obtained, the image being rasterized. To reconstruct the object, a filtered back projection onto the previously determined raw data can be used, for example. The reconstructed object can then be rasterized, for example, by superimposing a three-dimensional grid onto the reconstructed object, each volume element of the grid being assigned the corresponding local gray value of the object in the region of the volume element (voxel). Usually, the raster is predefined for example in computed tomography by the arrangement of the individual sensors of the sensor array used. However, it is also possible to define a raster which differs from this.

After reconstruction and rasterization of the object under examination are complete, a parameterization of the rasterized object is then determined in step 306. To this end, a user interface can be provided, for example, via which a user marks regions of the reconstructed object under examination at which there are multiple edges. Furthermore, a direction in which material interfaces should be sought proceeding from a voxel can also be specified by the parameterization.

In addition to a user input, a parameterization can also be determined by a first scan of the reconstructed object for material interfaces. To this end, for example, a scan of the entire object can initially be carried out assuming that the entire object only has straight, single material interfaces, so that a multiplicity of edge positions is determined. Then, the edge positions thus determined can be checked as to how well the gray value profile at the edge position matches the theoretically expected gray value profile for an isolated, straight material interface. If it is determined, for example via a chi-squared test, that the found gray value profile does not coincide sufficiently well with the expected gray value profile, the voxels in the surroundings of the material interface under examination are assigned a parameter which indicates that a multiple edge or a curved edge should be sought here.

After the parameterization of the reconstructed object is complete, parameter-dependent edge-detection operators are then applied to the reconstructed object in step 308. Edge-detection operators which determine the position of material interfaces from the gray value of the voxel and the gray values of the adjacent voxels are applied to each voxel or at least to a subset of the voxels. The type of edge-detection operator applied is determined by the parameter which is assigned to the voxel. If, for example, the parameter of the voxel under examination indicates that there is a multiple edge composed of three individual material interfaces in the surroundings of the voxel, a corresponding edge-detection operator which searches for such a multiple edge is applied to the voxel under examination. It can be the case that a plurality of parameters are assigned to a voxel. For instance, the parameterization of a voxel can indicate that a sequence of a plurality of material interfaces is present in a certain direction. The multiple edge operator is then designed to create a theoretical model of the gray value profile corresponding to the values of the parameterization and to compare the model with the gray values of the surrounding voxels. The exact position of the material interfaces can then be determined from the comparison of the actual gray values with the theoretical model.

The invention is not limited to one of the above-described embodiments but can be modified in many ways.

All the features and advantages, including design details, spatial arrangements and method steps, given in the claims, description and drawings can be essential to the invention both by themselves and in the many different combinations.

LIST OF REFERENCE SYMBOLS

100 Material interface
102 First region
104 Second region
106 Direction
108 Third region
202 Material interface
204 Material interface
206 Region
208 Region
210 Peak
212 Arrow
214 First analysis direction
216 Second analysis direction It is claimed:

1. A computer-implemented method for determining material interfaces of an object by means of at least one measurement of the object,
wherein a rasterized representation of the object is generated by the measurement,
wherein the rasterized representation has a multiplicity of measurement points,
wherein a measurement point has at least one item of image information which indicates a value of a measurement variable for the object at the position of the measurement point,
wherein the method has the following steps:
determining a parameterization of the rasterized representation of the object, wherein the parameterization assigns at least one parameter to each of the measurement points of a subset of the measurement points of the representation,
applying at least one parameter-dependent edge-detection operator to the measurement points of the rasterized representation, wherein an edge-detection operator is designed to determine the location of at least one material interface in the rasterized representation,
wherein, in the determination of the location of a material interface from the image information of a measurement point, the edge-detection operator takes into account at least the image information of a subset of the measurement points adjacent to the measurement point in the rasterized representation,
wherein at least one of the edge-detection operators is a multiple edge-detection operator which is designed, when applied to a measurement point, to determine the location of at least two directly adjacent material interfaces in the object, and
wherein the multiple edge-detection operator is applied to a measurement point if and only if at least one of the parameters of the measurement point indicates that a plurality of material interfaces are arranged directly adjacent to each other within the surroundings of the measurement point.

2. The method as claimed in claim 1, characterized in that the image information of a measurement point comprises at least one gray value which indicates the value of the measurement variable for the object at the location of the measurement point, and wherein the multiple edge-detection operator is designed to determine the location of the individual material interfaces of a multiple edge proceeding from a measurement point by fitting a theoretical model of the gray values for a multiple edge to the profile of the gray values of measurement points in the surroundings of the measurement point.

3. The method as claimed in claim 1, characterized in that the parameterization for a subset of the measurement points assigns at least two parameters to each measurement point of the subset, wherein for the measurement points of the subset, a parameter-dependent edge-detection operator is applied to the measurement point for each assigned parameter.

4. The method as claimed in claim 1, characterized in that at least one of the parameters of a measurement point defines an analysis direction within the rasterized representation, wherein the edge-detection operators are designed, when applied to a measurement point, to determine the location of at least one material interface in the analysis direction defined by the parameter of the measurement point.

5. The method as claimed in claim 4, characterized in that an analysis direction is defined for each subset of the measurement points by at least two of the parameters of a measurement point of the subset, wherein, for each analysis direction, at least one edge-detection operator is applied to the measurement point which determines the location of at least one material interface in the analysis direction in question.

6. The method as claimed in claim 1, characterized in that the parameterization is determined from a model of the object under examination.

7. The method as claimed in claim 6, characterized in that the model is a CAD model.

8. The method as claimed in claim 1, characterized in that the parameterization is generated by at least one user input.

9. The method as claimed in claim 1, characterized in that determining the parameterization comprises the following steps:
applying at least one single edge-detection operator to the measurement points of the rasterized representation, wherein the single edge-detection operator is designed to determine the location of an individual material interface in the rasterized representation, determining a measure of uncertainty for the location of the material interfaces determined, if the measure of uncertainty determined for a material interface exceeds a defined threshold value, assigning a parameter to the measurement points in the surroundings of the material interface, wherein the parameter indicates that a plurality of material interfaces are arranged directly adjacent to each other within the surroundings of the measurement point.

10. A device for carrying out measurements of an object and for determining material interfaces of an object by means of at least one measurement of the object, wherein a rasterized representation of the object is generated by the measurement, wherein the rasterized representation has a multiplicity of measurement points, wherein a measurement point has at least one item of image information which indicates a value of a measurement variable for the object at the position of the measurement point, wherein the device is designed to:

determine a parameterization of the rasterized representation of the object obtained from the measurement, wherein the parameterization assigns at least one parameter to each of the measurement points of a subset of the measurement points of the representation, apply at least one parameter-dependent edge-detection operator to the measurement points of the rasterized representation, wherein an edge-detection operator is designed to determine the location of at least one material interface in the rasterized representation from the image information of a measurement point, wherein, in the determination of the location of a material interface from the image information of a measurement point, the edge-detection operator takes into account at least the image information of a subset of the measurement points adjacent to the measurement point in the rasterized representation, wherein at least one of the edge-detection operators is a multiple edge-detection operator which is designed, when applied to a measurement point, to determine the location of at least two directly adjacent material interfaces in the object, and wherein the multiple edge-detection operator is applied to a measurement point if and only if at least one of the parameters of the measurement point indicates that a plurality of material interfaces are arranged directly adjacent to each other within the surroundings of the measurement point.

11. A non-transitory program product having instructions which can be executed by a computer and, when executed on a computer, prompt the computer to carry out the method as claimed in claim 1.

* * * * *